W. H. MORRIS.
BUTT REMOVING ATTACHMENT FOR CORN HARVESTERS.
APPLICATION FILED MAY 7, 1909.
1,017,987.
Patented Feb. 20, 1912.
3 SHEETS—SHEET 1.
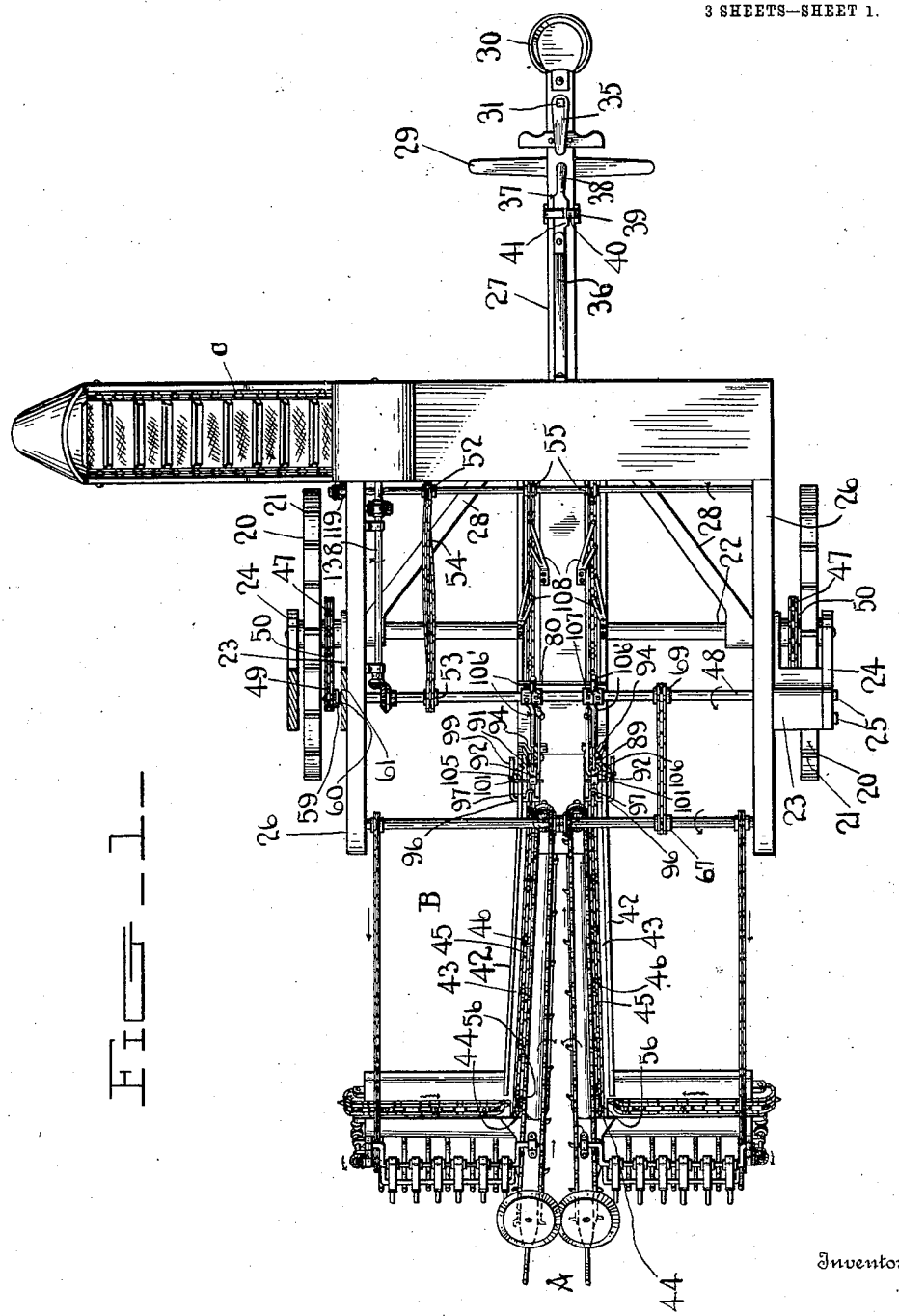

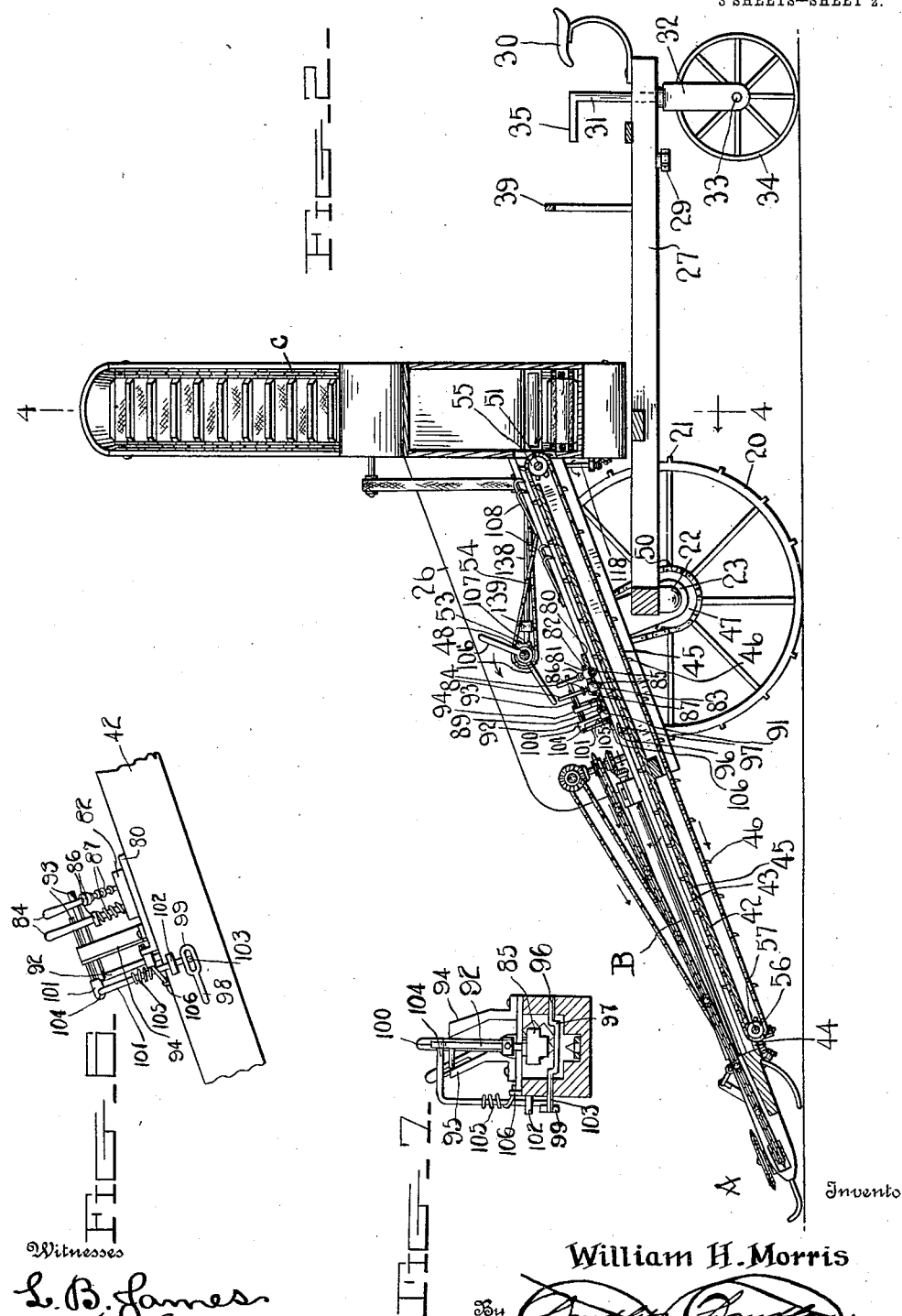

W. H. MORRIS.
BUTT REMOVING ATTACHMENT FOR CORN HARVESTERS.
APPLICATION FILED MAY 7, 1909.
1,017,987.
Patented Feb. 20, 1912.
3 SHEETS—SHEET 3.
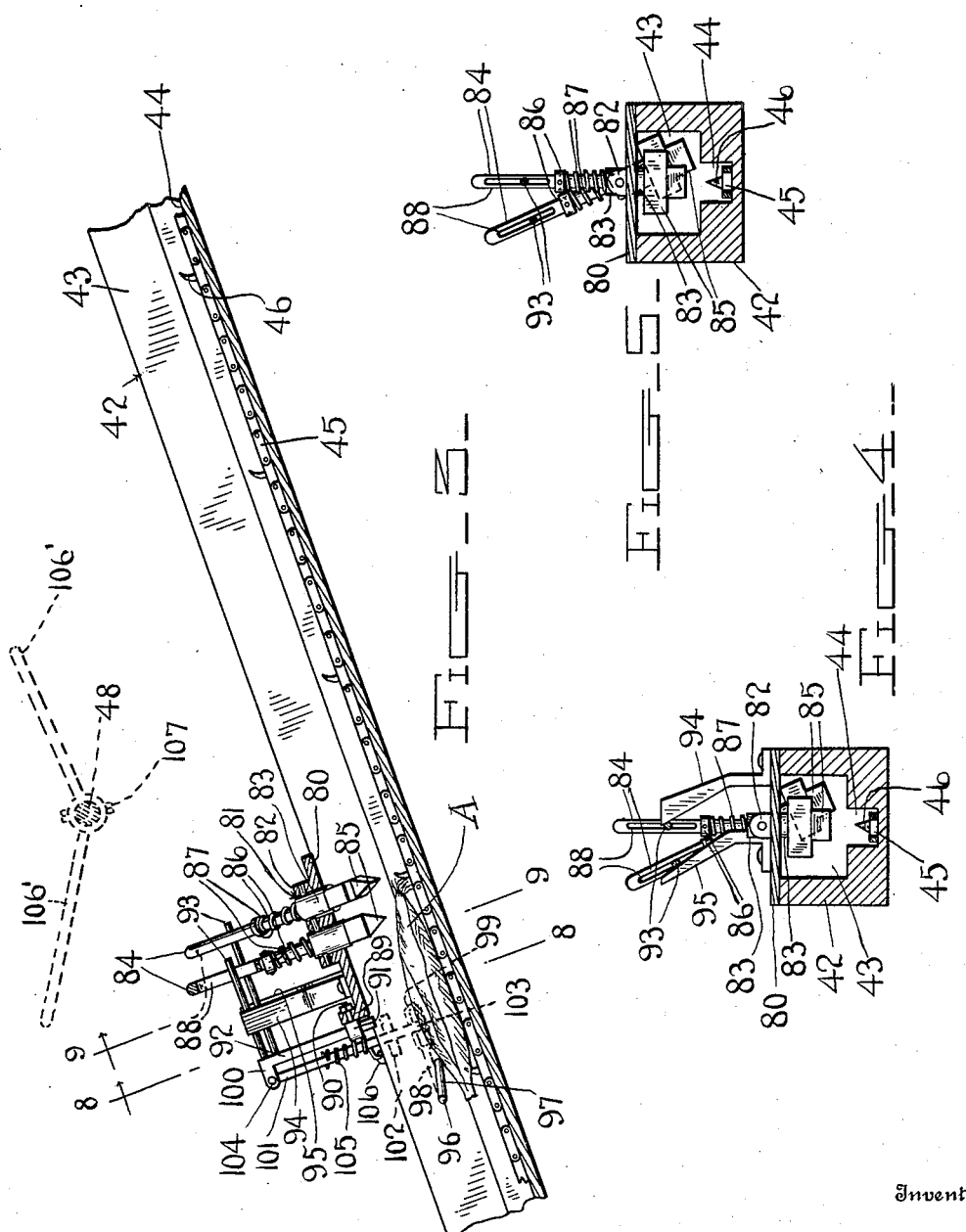
Witnesses
L. B. James
Inventor
William H. Morris
By
Attorneys

UNITED STATES PATENT OFFICE.

WILLIAM H. MORRIS, OF CARROLL, NEBRASKA.

BUTT-REMOVING ATTACHMENT FOR CORN-HARVESTERS.

1,017,987.   Specification of Letters Patent.   Patented Feb. 20, 1912.

Application filed May 7, 1909. Serial No. 494,611.

*To all whom it may concern:*

Be it known that I, WILLIAM H. MORRIS, a citizen of the United States, residing at Carroll, in the county of Wayne, State of Nebraska, have invented certain new and useful Improvements in Butt-Removing Attachments for Corn-Harvesters; and I do hereby declare the following to be a full, clear, and exact description of the invention, such as will enable others skilled in the art to which it appertains to make and use the same.

This invention relates to butt removing attachments for harvesters, and the object of this invention is to improve the construction and increase the efficiency of mechanisms of the above described type.

A further object of the invention is to provide a novel form of cutting device adapted to remove the ends of the ears so that the shucking may be more readily accomplished.

With these and other objects in view, my invention will be more fully described, illustrated in the accompanying drawings which show a preferred embodiment of the shucker and then specifically pointed out in the claims which are attached to and forming part of this application.

The invention further consists in certain novel arrangement of details and combinations of parts hereinafter fully described, illustrated in the accompanying drawings, and specifically set forth in the claims.

In the accompanying drawings, like characters of reference indicate like parts in the several views, and Figure 1 is a top plan view of a corn harvester provided with a shucker constructed in accordance with this invention. Fig. 2 is a longitudinal median section thereof. Fig. 3 is a detail view showing the ear cutting mechanism. Fig. 4 is a sectional view on the line 8—8 of Fig. 7. Fig. 5 is a similar view on the line 9—9 of Fig. 7. Fig. 6 is a section on the line 6—6 of Fig. 3 showing the cutting mechanism in elevation. Fig. 7 is a rear elevation of the mechanism shown in Fig. 6.

As an aid to the clear understanding of the device and its operation the same is shown as attached to and operated by a harvester of the conventional form having a gathering mechanism A, an ear snapping mechanism B and a conveyer or elevator C. This conveyer belt is operatively connected to the traction wheels of the harvester as shown in Figs. 1 and 3 of the drawings. Mounted upon the frame of this harvester are a pair of members 42 which are parallel at their upper ends and have at their lower ends a slight divergence as clearly indicated in Fig. 1. These members 42 are provided throughout their length with valleys 43 for the purpose of receiving the ears of corn. These valleys are further provided with longitudinal slots extending throughout the bottom as indicated at 44 and in these slots moves the upper side of a conveyer belt 45 provided with conveyer fingers 46 projecting therefrom. The under side of the belt 45 passes below the members 42 as can be clearly seen from reference to Fig. 3.

There will now be described the mechanism by means of which the tip and butt of each ear is cut off so as to leave the shucks free for removal from the ears.

Across each of the members 42 is mounted a cover plate 80 provided with openings 81 therethrough and these openings have adjacent each side thereof a bearing 82 wherein is mounted a rocking guide 83 through which pass the stems 84 of knife or cutter members 85. These cutter members are distinguished respectively by the terms front and rear cutter members, the front cutter member lying toward the snapping rolls while the rear cutter member lies toward the operator's seat. Each of the stems 84 is provided with a suitable collar 86 and between the collars 86 and the guide sleeves 83 are held compression springs 87 which normally serve to hold the knives raised as indicated in Fig. 7. The stems 84 are further provided with longitudinal slots extending along their upper ends as clearly indicated in Figs. 8 and 9 at 88. The plate 80 is further provided at its forward end with a bearing 89 wherein is mounted a swivel pin 90 which supports a swiveling sleeve 91. Held in said swiveling sleeve 91 to move therethrough is a plunger 92 which carries at its upper end a pair of rearwardly extending arms 93 one of which engages in one of the slots 88 while the other engages the other slot.

Mounted upon the plate 80 are guide members in the form of cam plates and comprising an inwardly inclined cam plate 94 and an outwardly inclined cam plate 95 the opposed surfaces of said cam plates being substantially parallel throughout. By means of this construction as the plunger 92 is raised or depressed the stems 84 are swung so that one or the other is positioned vertically while the remaining stem is inclined to one side.

In Figs. 7, 8 and 9 the front knife member 85 is shown as arranged vertically while the rear knife member is swung to one side. It will be plain from an inspection of these figures that if the arms 93 be moved downward by the plunger the guide 95 will force both the stems 84 to the right and will consequently bring the stem of the rear knife member to the position now occupied by the front knife member.

In order to actuate the plunger 92 upon the passage of an ear of corn there is provided a rod 96 which extends through the walls of the members 42 wherein it is positioned and this rod 96 has a rearwardly and downwardly projecting central portion 97 which lies within the valleys 43 while the outer end of this rod is provided with an arm 98 having a slotted eye 99 in its rear end. The plunger 92 is provided with a forwardly extending ear 100 and a rod 101 is held in a suitable bearing 102 and is provided with a lower angle portion 103 which engages in the slot 99 and an upper angle portion 104 which is slidably engaged in the ear 100. The rod 101 is further surrounded by a tension spring 105 which has one end attached to the rod and the other end to a lug 106 on the members 42. By means of this construction the rod 101 is normally depressed and carries with it the plunger 92 and arms 93.

In order to actuate the knife members 85 a shaft 48 is rotatably journaled in the frame and is adapted to be rotated by suitable gears co-acting with the traction wheels of the harvester as shown and has mounted thereon a pair of striking arms 106' which may be adapted to vary their angular relations by means of suitable nut screws 107.

In order to understand the operation of this device there has been indicated in Fig. 7 an ear of corn as at A in the act of passing beneath the cutting knives. As the ear strikes the trip 97 the rod 101 is raised and carries therewith the plunger 92. This causes the pin 90 to move up and the guides 94 and 95 act to bring the forward cutter member 85 in a vertical position. Meanwhile the shaft 48 is rotating and as this cutter member comes into the vertical position one of the arms 106' contacts with the upper ends thereof and forces the cutter member down thus severing the tip from the ear, the parts being so arranged with reference to speed and proportions that this tip comes just under the knife when the arm 106' strikes the stem 84 of the forward cutting member. This is permitted by means of the adjustability of the arm 106' on the shaft 48. Now as the ear A is carried farther up the butt of the ear passes from beneath the trip 97 and the rod 101 is brought down by the spring 105 carrying therewith the plunger 92 and fingers 93. This causes the rear cutter member 85 to be positioned vertically while the forward cutter member 85 is swung to the right of Figs. 8 and 9. The second arm 106' has been positioned previously on the shaft 48 so that the angular distance between the two arms 106' will be such as to permit the ear A to pass rearward so that only its butt remains underneath the rear member 85 when the arm 106' which actuates that member comes into operation. As this arm comes around it strikes the rear stem 84 and depresses the knife and cuts off the butt.

There has thus been provided a highly efficient device of the character described and for the purpose specified.

It is obvious that many minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a corn harvester, an ear end cutting mechanism comprising a pair of reciprocatory knives, means operable on the passage of an ear to throw the knives alternately into operative position, and other means to reciprocate said knives when in operative position.

2. In a corn harvester, a rotary shaft having projecting arms, an ear end cutting mechanism comprising a pair of reciprocatory knives, and means to move said knives alternately into the paths of said arms.

3. In a corn harvester, a rotary shaft having projecting arms, an ear end cutting mechanism comprising a pair of reciprocatory knives, and means operable by the passage of an ear of corn to move said knives alternately into the paths of said arms.

4. In a corn harvester, an ear conveyer, a rotary shaft having projecting arms, an ear end cutting mechanism held above and adjacent to said conveyer and comprising a pair of reciprocatory knives, and means operable by the passage of an ear of corn on said conveyer to move said knives alternately into the paths of said arms.

5. In a corn harvester, a reciprocatory ear end cutter, a swiveling sleeve supporting said cutter, a rotary shaft provided with a projecting arm, an ear conveyer, a trip adjacent said conveyer arranged to be lifted by the passage of an ear along said conveyer, and mechanism to move said sleeve on its swivel as the trip is moved.

6. In a corn harvester, a reciprocatory ear end cutter provided with a slotted stem, a swiveling sleeve supporting said cutter, a rotary shaft provided with a projecting arm, an ear conveyer, a trip adjacent said conveyer arranged to be lifted by the passage of an ear along said conveyer, a swivelly mounted plunger connected to said trip and operable thereby, a finger projecting from said plunger into said slot, and guides for said finger to move the same laterally as the plunger is reciprocated.

7. In a corn harvester, a reciprocatory ear end cutter provided with a slotted stem, a swiveling sleeve supporting said cutter, a rotary shaft provided with a projecting arm, an ear conveyer, means for rotating said shaft, means for actuating said conveyer, a trip engaging said conveyer arranged to be lifted by the passage of an ear along said conveyer, a swivelly mounted plunger connected to said trip and operable thereby, a finger projecting from said plunger into said slot, and guides for said finger to move the same laterally as the plunger is reciprocated.

8. In a corn harvester, a pair of reciprocatory ear end cutters, each of said cutters being provided with a slotted stem, swiveling sleeves each supporting one of said cutters, a rotary shaft provided with projecting arms, an ear conveyer, a trip adjacent said conveyer arranged to be lifted by the passage of an ear along said conveyer, a swivelly mounted plunger connected to said trip and operable thereby, fingers projecting from said plunger into said slots, and guides for said fingers to move the same laterally as the plunger is reciprocated and alternately bring said stems into the path of said arms.

9. In a corn harvester, a pair of reciprocatory ear end cutters, swiveling sleeves each supporting one of said cutters, means to move said sleeves on the swivel, a rotary shaft, a pair of arms mounted on said shaft, means to hold said arms in adjusted angular relation on the shaft, and means to rotate said shaft.

In testimony whereof, I affix my signature, in presence of two witnesses.

WILLIAM H. MORRIS.

Witnesses:
ARTHUR L. TUCKER,
LUCIAN CARTER.

Copies of this patent may be obtained for five cents each, by addressing the "Commissioner of Patents, Washington, D. C."